Patented Sept. 29, 1936

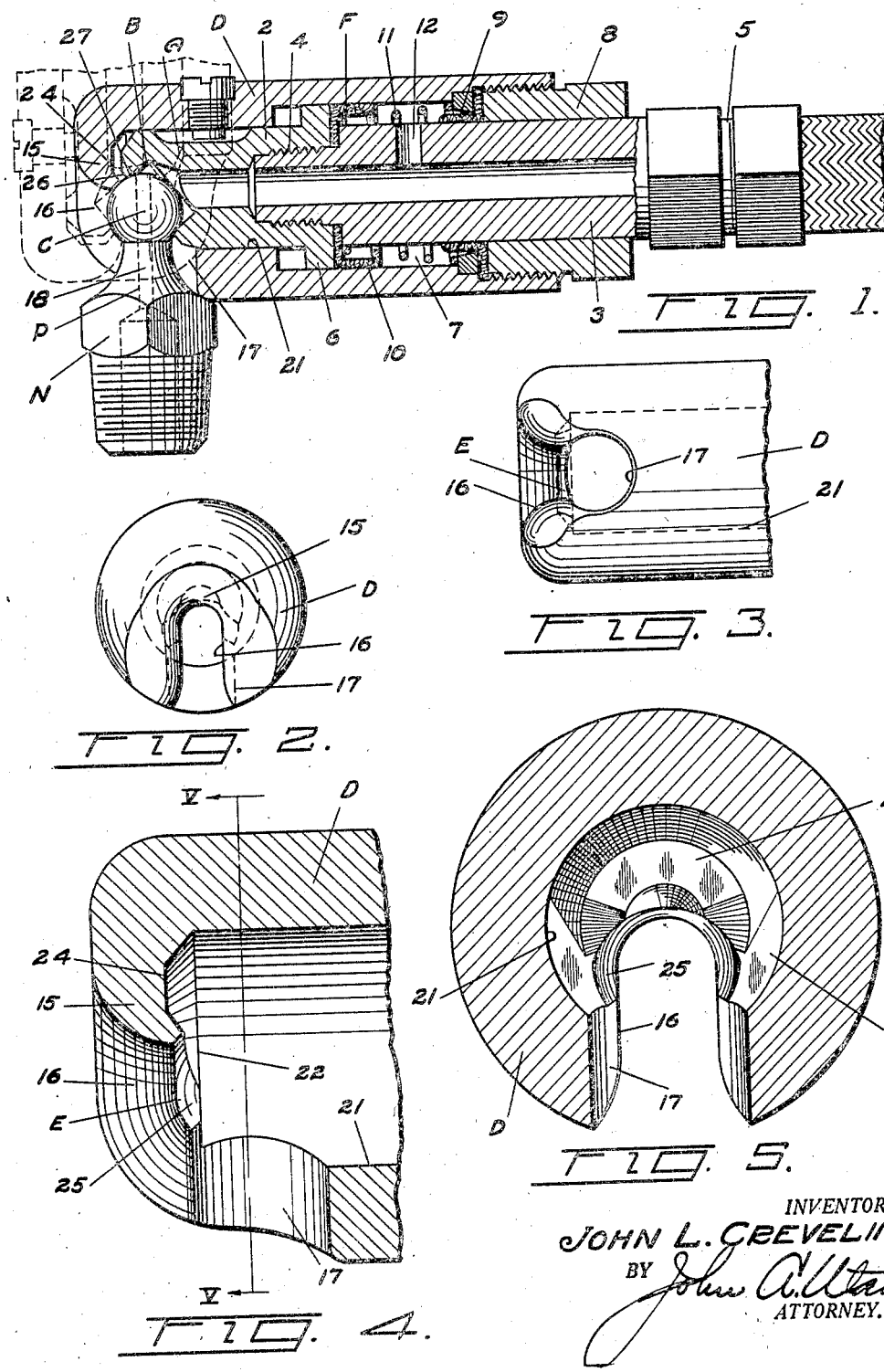

2,055,600

UNITED STATES PATENT OFFICE 2,055,600

LUBRICATING DEVICE

John L. Creveling, near Tucson, Ariz., assignor to The Lubrication Corporation, South Bend, Ind., a corporation of Delaware Application April 28, 1933, Serial No. 668,365

13 Claims. (Cl. 285—143)

This invention relates to improvements in lubrication devices and more particularly to lubricant discharge nozzles of the clamp type adapted for clamping engagement with a spherical headed lubricant receiving fitting.

An object of the invention is to provide a clamp type nozzle for engaging with a spherical headed fitting throughout a wide angular range, wherein the fitting engaging clamping jaw presents a relatively large contact surface thereby distributing thrust as between jaw and fitting head over a large area.

A further object is to provide a clamp type nozzle of the character described wherein unrestricted communication between the nozzle discharge orifice and the fitting inlet port may be maintained throughout the entire angular range of movement of the nozzle relative to the fitting.

Another object is to provide an improved method of constructing a clamp type nozzle of the character described.

Other objects, the advantages and uses of the invention will become apparent after reading the following specification and claims and viewing the accompanying drawing forming a part of this application, in which:

Fig. 1 is a sectional view of a clamp type lubricant discharge nozzle constructed in accordance with the invention;

Fig. 2 is a front end elevation of the nozzle;

Fig. 3 is a fragmentary bottom plan view of the nozzle;

Fig. 4 is an enlarged fragmentary sectional view of the fitting engaging clamping member of the nozzle; and Fig. 5 is a sectional view along the line V—V of Fig. 4.

In general, the lubricant discharge nozzle selected for illustration herein comprises, a conduit A having a discharge orifice B, the walls of which are fashioned to form an annular sealing contact with the spherical head C of a lubricant receiving fitting N, a clamping member D slidably mounted upon the conduit A provided with a spherical surfaced fitting engaging jaw E, and lubricant pressure operated means F for causing relative movement between the clamping member and the conduit to clamp the head C of the fitting N therebetween.

Referring particularly to Fig. 1, the conduit A may comprise two aligned sections 2 and 3 respectively secured together by cooperating screw threads 4. The section 2 includes the discharge orifice B and the section 3 is provided with screw threads 5 for connecting the conduit to a source of lubricant supply. The conduit section 2 has a diametrically enlarged portion 6 at its rearward end, adjacent to which, a leather cup washer 10 is fixed by inserting the inner edge of the washer between the opposed ends of the conduit sections 2 and 3.

The clamping member D is tubular in shape, with its forward end partially closed to form a clamping jaw overhanging the outer end of the conduit as hereinafter described. The rearward portion of the bore of the clamping member is diametrically enlarged to receive the enlarged portion 6 of the conduit section 2. This arrangement provides an annular chamber 7 about the conduit section 3 closed at its rearward end by a bushing 8 and leather sealing washer 9. A compression spring 11 is disposed within the chamber 7 bearing at opposite ends upon the conduit assembly A and clamping member assembly respectively. A passage 12 is provided through the wall of the conduit section 3 for establishing communication between the bore of the conduit and the annular chamber 7.

With reference to Figs. 4 and 5, the contours of the clamping member D and jaw E have been illustrated therein in detail and represent the principal features of the invention. The forward portion of the tubular body of the clamping member D is partially closed by an end wall 15 having a slotted portion 16 extending downwardly as shown into the side wall of the member D where it merges with a cylindrical walled aperture 17 through which the head C of the fitting N may be admitted. The slotted portion 16 is of sufficient width to admit the neck 18 of the fitting and its side walls are fashioned to conform with the tapering contour of the neck.

Subsequent to the formation of the bore 21 in the forward portion of the member D the interior of the wall 15 which is usually tapered because of the form of the drilled tool is machined to provide a surface 22 perpendicular to the axis of the member D. This operation may be carried out by the use of an end mill or end reamer. A pocket 24 having a flat bottom wall and sloping side and end walls, is next formed in the surface 22 of the wall 15 by a cam operated fly cutter. The pocket is arcuate in shape and extends substantially 220° about the center of the surface 22 above the slotted portion 16 of the wall 15.

The inner edge of the surface 22 about the slotted portion 16 is finished with a ball shaped cutter to provide a spherical seat 25 defining substantially 272° of the zone of a sphere. The radius about which the seat 25 is generated is that of the head C of the fitting N thereby providing an extensive seat conforming exactly to the contacting surface of the fitting head when in place adjacent the jaw E.

Referring now to Fig. 1, the forward end 26 of the conduit member 2 is inclined with respect to the axis thereof and the discharge orifice is formed therein with its longitudinal axis arranged to intersect the center of the spherical head C of the fitting N when in place upon the seat 25 of the jaw E. An annular spherical walled contact surface 27 is formed at the mouth of the discharge orifice B to form a fluid tight contact seal between the fitting head and the conduit so that lubricant may not escape during its discharge from the nozzle into the fitting. The radius of the surface 27 is that of the head C of the fitting. The purpose of the arcuate pocket 24 is to receive the forward and upper end of the conduit section 2 so that the inclined face 26 containing the discharge orifice B and its sealing contact surface 27 may be moved relatively close to the jaw seat 25 and thus clamp the fitting head therebetween.

In operation, the nozzle is initially applied to the head C of the lubricant receiving fitting N by moving the nozzle laterally over the head, thus admitting the head to that space between the spherical seats or surfaces 25 and 27 respectively through the cylindrical walled region 17 of the slotted portion 16 of the member D. As the head of the fitting is admitted between the surfaces 25 and 27 the spring 11 may yield and thereafter exert relative thrust between the clamping member D and conduit assembly A to attach the nozzle yieldingly upon the fitting. Lubricant under pressure may now be admitted to the nozzle where it may act within the chamber 7 to clamp the nozzle securely upon the fitting head whereupon lubricant may be discharged through the discharge orifice B into the fitting N without fear of leakage between the nozzle and fitting as the sealing pressure between the contacting surfaces of the fitting and conduit will be in proportion at all times to the lubricant pressure to which the nozzle is subjected.

Regardless of the extremely high pressure applied by the mechanism F in clamping the nozzle upon the fitting, the relatively large expanse of the seat 25 of the jaw E is such as to prohibit damage to the accurately surfaced head C of the fitting thus preserving the head against mutilation which would otherwise render it ineffective for cooperation with the contact surface 27 of the conduit to provide lubricant tight sealing contact therebetween. The uninterrupted spread of the seat 25 over substantially 272° of a zone of the fitting head serves to assure support of the head so as to render it capable of withstanding high clamping pressure directed along the axis of the conduit. Thus also, the fitting head with this arrangement is cradled by the support surface 25 in such a manner that the pressure applied to the fitting head by the conduit 2 (through the surface 27) does not tend to cause displacement of the fitting head, and the distribution of pressure over all parts of the surface of the fitting head contacted by the surface 25 is well equalized.

Further a clamp type nozzle constructed as herein described, although possessing an extensive zone of contact between the clamping member and the fitting head, is capable of maintaining unrestricted lubricant communication between the conduit discharge orifice and the inlet port of the fitting during the entire and relatively wide angular range of movement of the nozzle over the fitting head as indicated by dotted lines in Fig. 1, a feature not to be found in the other nozzles affording relatively large fitting engaging clamp areas. This objective of the invention is chiefly attained through the location of the pocket 24 on the inner end wall of the clamping member so as to permit of the use of an inclined contacting area on the nozzle and to permit the nozzle to move into close proximity to the contact zone of the clamping member.

It is to be understood that the above described embodiments of the invention are for the purpose of illustration only and various changes may be made therein without departing from the spirit and scope of the invention.

I claim:

1. A clamp type lubricant discharge nozzle comprising, a conduit having its discharge end provided with a fitting engaging annular contact surface with its mean plane inclined relative to the axis of the conduit, and a clamping member mounted for movement parallel to the axis of the conduit for clamping said conduit upon the head of a lubricant receiving fitting, said clamping member having a fitting engaging surface of concavely spherical contour, said last named surface roughly approximating a fragment of a zone of a sphere and adapted to embrace said fitting surface over at least 180° of an arc and having its maximum arcuate dimension lying substantially in a plane substantially perpendicular to the axis of the conduit.

2. A clamp type lubricant discharge nozzle comprising, a conduit, one end of which is adapted for connection with a source of lubricant supply and the other end of which is formed for sealing engagement with a spherical head of a lubricant receiving fitting, and a clamping member mounted on the conduit for sliding movements thereed along relative to said conduit and parallel to the axis thereof for clamping said conduit upon a spherical head surface of a lubricant receiving fitting, said clamping member having a fitting engaging surface of concavely spherical contour, said last named surface roughly approximating a fragment of a zone of a sphere and adapted to embrace said fitting surface over at least 180° of an arc and having its maximum arcuate dimension along a line lying substantially in a plane inclined relative to the mean plane of the zone of contact between the conduit and fitting.

3. A clamp type lubricant discharge nozzle comprising, a conduit having a discharge orifice surrounded by a contact surface having its mean plane inclined relative to the axis of the conduit and generated by the revolution of a curved line about an axis, a clamping member movable along the axis of said conduit and having a contact surface formed with its maximum arcuate dimension lying substantially in a plane substantially perpendicular to the axis of the conduit and generated by the revolution of a curved line about an axis throughout at least 180°, the radii of said curved lines being substantially equal, and means for causing relative movement between said clamping member and said conduit to clamp the spherical head of a lubricant receiving fitting between said surfaces.

4. A lubricant discharge nozzle comprising, a conduit having one end adapted for connection with a source of lubricant supply and the other end formed to provide an end face inclined with respect to the axis of the conduit within which the discharge orifice of the conduit is located, and a clamping member mounted for movement in a path parallel to the axis of said conduit, said clamping member having a portion overhanging said inclined face, said portion being provided with a contact surface conforming to and adapted to engage with the head of a lubricant receiving fitting, said overhanging portion being further provided with a pocket disposed above said contact surface for partially receiving the adjacent end of said conduit.

5. A lubricant discharge nozzle for servicing a spherical headed lubricant receiving fitting comprising, a conduit having its forward end wall inclined with respect to the axis thereof and further formed with a discharge orifice located in said end wall, an annular, spherical surfaced seat formed in the end wall surrounding said orifice, a clamping member mounted for movement in a path parallel to the axis of said conduit, said clamping member having a fitting engaging surface generated by the revolution for at least 180° of a curved line about an axis intersecting the center of said annular seat, and means for causing relative movement between said conduit and said clamping member to clamp said spherical headed fitting therebetween.

6. A lubricant discharge nozzle for servicing a spherical headed lubricant receiving fitting comprising, a conduit having its forward end wall inclined with respect to the axis thereof and further formed with a discharge orifice located in said end wall, an annular, spherical surfaced seat formed in the end wall surrounding said orifice, a clamping member mounted for movement along the axis of said conduit, said clamping member having a fitting engaging surface generated by the revolution for at least 180° of a curved line about a radius equal to the radius of said annular seat, and means for causing relative movement between said conduit and said clamping members to clamp said spherical headed fitting therebetween.

7. A lubricant discharge nozzle comprising, a conduit having one end adapted for connection with a source of lubricant supply and the other end formed to provide an end face inclined with respect to the axis of the conduit within which the discharge orifice of the conduit is located, a clamping member mounted for movement along said conduit, said clamping member having a portion overhanging said inclined face, said portion being provided with a contact surface conforming to and adapted to engage with the head of a lubricant receiving fitting, said overhanging portion being further provided with a spocket adapted partially to receive the adjacent end of said conduit, and means for causing relative movement between said conduit and said clamping member.

8. A clamp type lubricant discharge nozzle comprising, a conduit having its discharge end provided with an annular fitting engaging contact surface the mean plane of which is inclined relative to the axis of said conduit, a clamping member mounted for movement parallel to the axis of said conduit for clamping said conduit upon the head of a lubricant receiving fitting, said clamping member having a fitting engaging surface of concavely spherical contour formed with its maximum arcuate dimension lying substantially in a plane substantially perpendicular to the axis of the conduit, said last named surface roughly approximating a fragment of a zone of a sphere and adapted to embrace the surface of said fitting head over at least 180° of an arc, and means for causing relative movement between said conduit and said clamping member to clamp the head of a lubricant receiving fitting therebetween.

9. A lubricant discharge nozzle comprising, a conduit having one end adapted for connection with a source of lubricant supply and the other end formed to provide an end face inclined with respect to the axis of the conduit within which the discharge orifice of the conduit is located, and a clamping member for movement along the axis of said conduit, said clamping member having a portion overhanging said inclined face, said portion being provided with a contact surface conforming to and adapted to engage with the head of a lubricant receiving fitting, said overhanging portion being further provided with a pocket for partially receiving the adjacent end of said conduit.

10. A lubricant discharge nozzle for servicing a spherical headed lubricant receiving fitting comprising, a conduit having its forward end wall inclined with respect to the axis thereof and further formed with a discharge orifice located in said end wall, an annular, spherical surfaced seat formed in the end wall surrounding said orifice, a clamping member mounted for movement parallel to the axis of said conduit, said clamping member having a fitting engaging surface generated for at least 180° by the revolution of a curved line about an axis intersecting the center of said annular seat, said clamping member having a pocket formed therein for receiving the foremost end of the inclined portion of said conduit, and means for causing relative movement between said conduit and said clamping members to clamp said spherical headed fitting therebetween.

11. A clamp type lubricant discharge nozzle comprising, a conduit having one end adapted for connection with a source of lubricant supply and the other end formed with a surface inclined at other than a right angle to the axis of the conduit, an annular fitting engaging contact seat formed on said inclined surface surrounding the discharge end of the conduit bore, a clamp sleeve slidably mounted upon the outer wall of said conduit adjacent to the said inclined end surface thereof for movement longitudinally of the axis of the conduit, means retaining said sleeve against rotation relative to said conduit, said clamp sleeve having its forward end partially closed and providing a portion overhanging said inclined end of said conduit, said overhanging portion of said clamp sleeve being disposed substantially perpendicular to and across the axis of said conduit, and a fitting engaging spherical walled seat formed on the inner side of said overhanging portion, said surface roughly approximating a zone of a sphere and extending throughout an angle of at least one hundred and eighty degrees, a part of the inner wall of said overhanging portion above said seat having a pocket formed therein to receive the foremost end of the inclined end portion of said conduit thereby to minimize the distance between said fitting engaging contact seat and said spherical walled seat.

12. A clamp type lubricant discharge nozzle comprising, a conduit having a discharge orifice surrounded by a contact surface the mean plane of which is inclined at an angle other than 90° relative to the axis of the conduit and adapted sealingly to engage with the spherical head of a lubricant receiving fitting, a clamping member movable along and longitudinal of the axis of said conduit, said clamping member having a bifurcated jaw portion overhanging the discharge end of said conduit, the inner side of said bifurcated portion being formed with a concavely spherical fitting engaging surface extending about the crotch thereof and having its maximum arcuate dimension lying substantially in a plane substantially perpendicular to the axis of said conduit.

13. A clamp type lubricant discharge nozzle comprising, a conduit having an outlet orifice formed for sealing engagement with a spherical head surface of a lubricant receiving fitting, a clamping member mounted on said conduit for movement parallel to the axis thereof for clamping the conduit on a fitting with said orifice in sealing engagement with the fitting head surface, said clamping member having a fitting engaging surface approximating a fragment of a zone of a sphere and adapted to embrace the spherical fitting head surface over an area the maximum arcuate dimension of which lies within the range 180° to 272°, inclusive of both limits, said dimension being measured along a line lying substantially in a plane inclined at an acute angle to the mean plane of contact between the conduit orifice and the fitting head surface.

JOHN L. CREVELING.